No. 841,937. PATENTED JAN. 22, 1907.
M. S. CONLY.
ROLLER BEARING.
APPLICATION FILED NOV. 27, 1905.
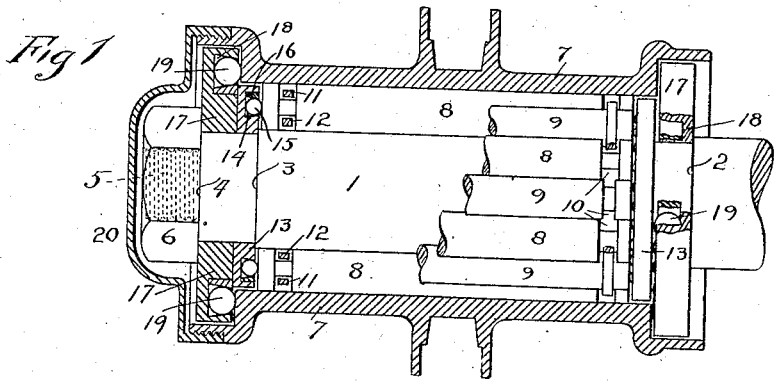
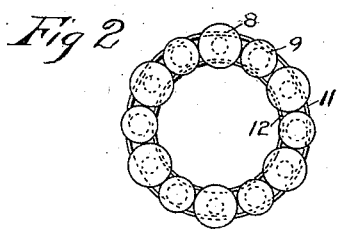
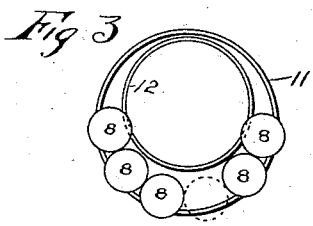
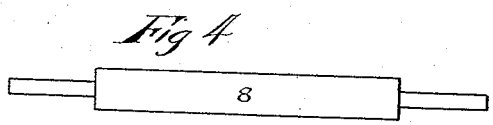
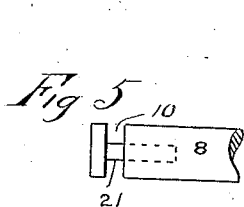
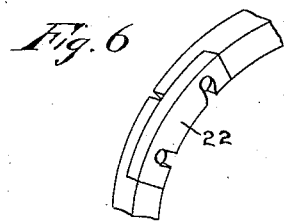
Witnesses
Harry A. Brooks
B. W. Pierce
Inventor
Mahlon S. Conly
By
Mignon Ford
Attorney

UNITED STATES PATENT OFFICE.

MAHLON S. CONLY, OF LOS ANGELES, CALIFORNIA.

ROLLER-BEARING.

No. 841,937.  Specification of Letters Patent.  Patented Jan. 22, 1907.

Application filed November 27, 1905. Serial No. 289,303.

*To all whom it may concern:*

Be it known that I, MAHLON S. CONLY, a citizen of the United States, residing at Los Angeles, in the county of Los Angeles and State of California, have invented certain new and useful Improvements in Roller-Bearings; and I do hereby declare the following to be a full, clear, and exact description of the invention, such as will enable others skilled in the art to which it appertains to make and use the same.

This invention relates to antifriction-bearings, and has for its object to provide a bearing which will be simple and cheap in construction and in which at the same time the friction shall be reduced to a minimum.

It is also an object of this invention to provide a bearing in which the rollers or antifriction devices can be readily assembled or taken apart.

A further object of the invention is to provide a bearing in which it is not necessary to form grooves or collars on the shaft supporting or supported by said bearing.

With these and other objects in view the invention may be embodied in the form described in this specification and shown in the accompanying sheet of drawings, in which—

Figure 1 is a sectional view through the hub of a vehicle, other parts in elevation and partly broken away. Fig. 2 is an end view of the rollers and retaining-rings, removed from the bearing. Fig. 3 is a view of the retaining-rings and some of the rollers, showing the manner in which they are assembled in the retaining-rings. Figs. 4, 5, and 6 represent alternate constructions.

Reference character 1 designates an axle of a vehicle, having shoulders 2, 3, and 4 formed thereon and the threaded portion 5 adapted to receive a nut 6. A hub 7 surrounds that portion of axle 1 between shoulders 2 and 4, being held from contact therewith by rollers 8, which in turn are separated from each other by rollers 9 of smaller diameter. Rollers 8 and 9 are provided near their ends with grooves 10, said grooves being wider in rollers 8 than in rollers 9, and the portions at the bottoms of the grooves being of larger diameter in rollers 9 than in rollers 8. In grooves 10 retaining-rings 11 and 12 are adapted to work. By this construction the retaining-rings contact with the sides and bottoms of the grooves in rollers 9 only.

Collars 13 are fitted to the axle 1, adjacent to the extremities of the rollers, and have grooves 14 facing the latter, in which are held balls 15, being retained in said grooves by rings 16. Balls 15 roll in contact with the ends of the rollers 8 and 9 when the latter tend to move out of their position in the direction of their axes. Collars 17 are also affixed to the shaft and have similar grooves 18, holding balls 19, which bear against a shoulder formed in the hub 7, whereby the end play of the latter is limited. A cap 20 is affixed to the end of the hub for the purpose of excluding dust from the bearing.

In the preferred construction rings 11 and 12 are made of any elastic material suitable for the purpose, preferably spring-tempered steel.

In Fig. 3 is illustrated the manner in which the rings are arranged for the assembling of the large rollers, after which said rollers may be moved around to their places and the smaller rollers 9 interposed between them, the last one being placed in position by springing the rings sufficiently for the purpose.

In Fig. 4 is shown a form of roller in which the enlarged ends are omitted and the roller put in place by sliding the small end far enough through the rings to allow the other end to slip into place, after which the roller may be placed in its normal position and be held there by the balls 15, as hereinbefore stated.

In Fig. 5 is shown a roller having an end formed with a pin, which is pressed into the central portion of the roller after the rings have been placed in position, in which case the rings may be of more rigid construction than in the preferred form of this invention.

In Fig. 6 is shown a ring formed with a joint, said ring being of an elastic character, so that when the latch 22 is removed the ring may be opened and allow the admission or removal of the rollers, as will be readily understood from the illustration.

The operation of this invention is as follows: Motion being communicated to the hub 7 by any means, the rollers 8 will turn in the same direction as the hub and will revolve around the axle in the usual manner, while the rollers 9 will revolve around the axle in the same direction as rollers 8, but rotate on their own axes in a contrary direction. Ring 11 will rotate around the axle in a contrary direction to that of the rollers, there being rolling contact only between said ring and rollers 9. The rollers and hub are retained in position longitudinally, as has been already explained. The manner of preventing the end play of the hub has also been explained.

I claim—

1. In a roller-bearing, a casing, an axle within said casing, a plurality of bearing-rollers contacting with both casing and axle, intermediate rollers each having a reduced portion, retaining-rings contacting with the sides of said reduced portions remote from the axle and retaining-rings contacting with the sides of said reduced portions adjacent to the axle; neither sets of rings contacting with the bearing-rollers.

2. In a roller-bearing, a casing, an axle within said casing, a plurality of bearing-rollers contacting with both casing and axle, intermediate rollers each having reduced portions near the ends thereof, retaining-rings contacting with the side of said reduced portions adjacent to the axle, and retaining-rings contacting with the side remote from the axle, said rings being out of contact with the bearing-rollers.

In testimony whereof I have signed my name to this specification, in the presence of two subscribing witnesses, at Los Angeles, in the county of Los Angeles, State of California, this 17th day of November, A. D. 1905.

MAHLON S. CONLY.

Witnesses:
MARIE H. HUEHNER,
HARRY A. BROOKS.